United States Patent [19]
de Groot

[11] Patent Number: 5,831,733
[45] Date of Patent: *Nov. 3, 1998

[54] APPARATUS AND METHODS FOR MEASURING GAPS WHILE COMPENSATING FOR BIREFRINGENCE EFFECTS IN THE MEASUREMENT PATH

[75] Inventor: Peter de Groot, Middletown, Conn.

[73] Assignee: Zygo Corporation, Middlefield, Conn.

[*] Notice: The term of this patent shall not extend beyond the expiration date of Pat. No. 5,557,399.

[21] Appl. No.: 826,862

[22] Filed: Apr. 11, 1997

Related U.S. Application Data

[63] Continuation-in-part of Ser. No. 608,258, Feb. 28, 1996, Pat. No. 5,644,562.

[51] Int. Cl.⁶ .................... G01B 9/02; G01J 4/00
[52] U.S. Cl. ............. 356/369; 356/351; 356/357; 369/110
[58] Field of Search .................... 356/364–369, 356/351, 357, 358; 369/47, 50, 100, 110

[56] References Cited

U.S. PATENT DOCUMENTS

| | | | |
|---|---|---|---|
| 3,855,625 | 12/1974 | Garnier et al. | 360/102 |
| 4,593,368 | 6/1986 | Fridge et al. | 364/525 |
| 4,606,638 | 8/1986 | Sommargren | 356/351 |
| 5,218,424 | 6/1993 | Sommargren | 356/358 |
| 5,280,340 | 1/1994 | Lacey | 356/357 |
| 5,557,399 | 9/1996 | de Groot | 356/357 |
| 5,600,441 | 2/1997 | de Groot | 356/345 |
| 5,644,562 | 7/1997 | De Groot | 356/357 |

OTHER PUBLICATIONS

"Optical Shop Testing", Second Edition, Edited by Daniel Malacara, Chapter 1, pp. 1–49 (Wiley, New York 1992).
B. Bhushan, "Tribology and Mechanics of Magnetic Storage Devices", pp. 765–797 (NY: Springer–Verlag, 1990).
C. Lacey, R. Shelor, A. Cormier, "Interferometric measurement of disk/slider spacing: The effect of phase shift on reflection", (IEEE Transactions on Magnetics), vol. 29, No. 6, Nov. 1993.
"Handbook of Optics", Chapter 27, vol. II, pp. 27.1–27.27 (McGraw–Hill, Inc. 1995).

*Primary Examiner*—Hoa Q. Pham
*Attorney, Agent, or Firm*—Francis J. Caufield

[57] ABSTRACT

An apparatus and methods for measuring and compensating for birefringence in a rotating ground glass disk (20) such as are employed in polarization based optical flying height testers. The polarized light (1, 3) impinges on the top surface (24) of the disk (20) and is refracted through the disk to a measurement point (90) on the opposite surface (25) from which it is reflected back through the disk (20) and refracted before it exits the disk (20) in a beam (9) containing both s αand p polarizations which are detected by a phase detector (13) which measures any difference in phase between the s and p polarizations. Any variation of the phase $\theta_G$ with respect to the position defined by the measurement point provides the birefringence parameters $b_\parallel, b_\perp$ for the positions on the disk (20). The phase detector (13) measures the phase $\theta_G$ at a skew angle $\zeta$ defined between the plane of incidence (101), defined by the existing beam (9) and the incident beam (3), drawn through the measurement point (90) perpendicular to a radius line (102) for the disk (20).

40 Claims, 3 Drawing Sheets

APPARATUS AND METHODS FOR MEASURING GAPS WHILE COMPENSATING FOR BIREFRINGENCE EFFECTS IN THE MEASUREMENT PATH

CROSS-REFERENCE TO RELATED APPLICATIONS

This application is a continuation-in-part of commonly owned U.S. patent application Ser. No. 08/608,258 filed on Feb. 28, 1996 for "Method And Apparatus For Measuring And Compensating Birefringence In Rotating Disks" in the name of Peter de Groot, now U.S. Pat. No. 5,644,562, and is related to commonly owned U.S. patent application Ser. No. 08/523,559 filed Sep. 5, 1995 for "Homodyne Interferometric Receiver And Calibration Method Having Improved Accuracy And Functionality", now U.S. Pat. No. 5,663,793, by Peter de Groot.

BACKGROUND OF THE INVENTION

The present invention generally relates to high-speed, high precision measurement of the distance between two surfaces, one of which is on a substantially transparent element. In particular, the invention relates to an apparatus and method for measuring and compensating for birefringence effects in a transparent element through which gaps are measured.

A frequently-encountered problem in industrial inspection and quality control is the precise measurement of small distances between surfaces. In magnetic data storage systems, for example, it is required to measure the flying height of a slider flying over and closely proximate to a rapidly rotating rigid disk to verify the performance of the slider assembly. The flying height, as used herein, is the distance between the magnetic head pole and the surface of the rotating rigid disk; e.g., see M. F. Garnier, et. al., U.S. Pat. No. 3,855,625 issued Dec. 17, 1974. Such flying heights are generally less than 250 nm (10 $\mu$-inch) depending on the design of the slider, and may be as close as a few tens of nanometers. Because the flying height is a critical performance parameter in magnetic data storage systems, dynamic measurement of flying height plays a central role in the design and production testing of sliders. And more recently, it is increasingly important to be able to study the topography of the slider with respect to the magnetic surface to assess slider aerodynamic characteristics in relation to magnetic performance at various speeds and altitudes.

Optical means for measuring the flying height are known as optical flying height testers (OFHT's). High-precision OFHT's are almost invariably based on interferometry. Interferometers are capable of determining the distance to an object, the topography of the object, or like physical parameters involving physical lengths (see, for example, Chapter 1 of the book *Optical Shop Testing*, second edition, edited by Daniel Malacara (Wiley, New York, 1992). One of the fundamental difficulties of prior art optical techniques is that the interface between the slider ABS and a real hard disk cannot be inspected directly. Therefore, most OFHT's use a transparent surrogate disk, most commonly a dielectric glass disk, in place of a real magnetic hard disk. Here, a measurement light beam passes through the glass disk before and after interacting with the slider-glass interface. The optical interference effect at the slider-glass interface provides the necessary information for flying height measurement. Examples of prior-art OFHT's incorporating a glass disk may be found in U.S. Pat. No. 4,593,368 to D. A. Fridge, et al. and in U.S. Pat. No. 5,280,340 to C. Lacey.

Further examples of prior art systems for measuring the flying height of a slider assembly are disclosed in B. Bhushan, *Tribology and Mechanics of Magnetic Storage Devices*, pp. 765–797 (New York: Springer-Verlag, 1990).

The interaction between the glass disk and the measurement beam is important to the accuracy of the flying-height measurement. This is particularly true for a class of prior-art OFHT's that employ polarized light as part of the measurement apparatus. A polarization-based OFHT measures the flying height by the detection and analysis of the polarization-dependent characteristics of a beam or combination of beams preferably reflected at an oblique angle from the slider-disk interface. Advantageous features of polarization-based OFHT's include high accuracy, improved reliability with respect to competitive systems, and the ability to measure down to actual contact. Examples of prior art polarization-based OFHT's are provided in commonly-owned U.S. Pat. Nos. 4,606,638 and 5,218,424, 5,600,441, and 5,557,399.

A difficulty with polarization-based OFHT's is that they are sensitive to any polarization-dependent phenomena in the glass disk or other components of the relevant optical paths, including birefringence, which may be defined as polarization-dependent variation in the index of refraction of the glass disk. Birefringence modifies the polarization state of the measurement beam in a such a manner that it must be accounted for to achieve greater precision and accuracy than that afforded by prior art devices. Of special concern is the influence of birefringence generated by the stress pattern in a rapidly-rotating glass disk in those devices that use a surrogate disk in place of a magnetic disk. The resulting measurement errors can be as large as 50 nm. Although polarization-based OFHT's are well known in the art, the prior art does not provide any means of measuring or compensating birefringence in such polarization-based OFHT's.

An additional consideration in flying height testing relates to the phase change that occurs at the slider surface upon reflection. The phase change can easily be misinterpreted as a change in flying height, resulting in errors as large as 20 nm. To correct for this effect, one must know the phase change exactly, using a priori knowledge of the complex index of refraction of the material. See, for example, the article entitled "Interferometric measurement of disk/slider spacing: The effect of phase shift on reflection," by C. Lacey, R. Shelor, A. Cormier (IEEE Transaction on Magnetics). Most often, an instrument known in the art as an ellipsometer measures the complex index of the slider in a separate metrology step, independent of the OFHT. However, U.S. Pat. No. 5,557,399 issued in my name on Sep. 17, 1996 for "Optical Gap Measuring Apparatus and Method" discloses a polarized based OFHT tester and associated methods for measuring the complex index of the slider in situ. The approach advocated there obviates the need for a separate metrology station, since the apparatus for the complex-index measurement comprises substantially the same apparatus employed for the flying height measurement. However, since the method and means disclosed in the aforementioned patent also involve analysis of a polarized beam that passes through a glass disk, birefringence can adversely affect the accuracy of the complex index measurement.

An alternative approach to measuring the complex index of refraction of the slider is to incorporate a known form of ellipsometer in an existing flying height tester. Known forms of ellipsometer are taught in Chapter 27 of the book "Handbook of Optics", Vol.II (McGraw-Hill, Inc., 1995), pp.27.1–27.27. However, since ellipsometers analyze the change in polarization of a beam reflected at an oblique from the surface of the material being tested, birefringence in the rotating glass disk also adversely affects the ellipsometric analysis. The birefringence phenomenon, therefore, places severe limitations on the ability of an ellipsometer to perform in-situ measurements of the complex index. Thus, the prior art does not provide a satisfactory method and means for in-situ measurement of the complex index in the presence of glass-disk birefringence. These disadvantages of the prior art are overcome by the present invention.

There is, therefore, a critical, unmet need for a method and apparatus for measuring and compensating for birefringence effects that may exist in the optical path of insturments and intended to measure small gaps between two surfaces.

Consequently, it is a primary object of this invention to provide apparatus and methods by which birefringence effects in the optical paths of polarization based gap measurement devices may be compensated for to enhance their accuracy and precision.

It is yet another object of the present invention to provide apparatus and methods by which the birefringence of surrogate rotating glass disks in optical flying height testers can be compensated for in the measurement of the flying heights and topography of magnetic sliders flying over the surrogate disk at various speeds, atititudes, and altitudes.

Other objects of the invention will in part be obvious and in part hereinafter when reading the detailed description in conjunction with the drawings.

SUMMARY OF THE INVENTION

The present invention provides polarization based apparatus and methods for measuring gaps while compensating for birefringence effects in optical paths implicated in the illumination and measurement of those gaps. The birefringence induced in rotating glass disks, such as are employed in Optical Flying Height Testers (OFHT's), is particularly described. Birefringence in the glass disk, the difference in its index of refraction along different axes, varies because of the variation in rotationally induced stress which in turn alters the state of polarization of any light passing through the disk. In the invention, a polarization-based OFHT measures the flying height of a magnetic slider with respect to a rotating glass disk by analysis of the polarization-dependent properties of light reflected from the slider-disk interface. This technique is referred to herein as polarization analysis, and preferably provides the relative phase between two polarization components of the reflected light, as well as the intensities of the two polarization components.

The apparatus of the present invention permit the implementation of different methodologies to assess and compensate for birefringence in surrogate glass disks used in the measurement of the flying height. These methods involve measurement various approaches with or without the slider present, with the slider present in any of a number of controlled positions with respect to the disk, compensation while the slider is moving with respect to the disk, or compensation after all measurements have been made. Precision control of the slider, its timing and placement with respect to the disk, and control and calculation algorithms promote flexibility in the methodology to be implemented depending on the application.

In a first, presently-preferred embodiment of the present invention, in a first step, polarization analysis is performed on the disk alone, with the slider removed, at one or more positions on the disk. In a next step, a characteristic or plurality of characteristics of the disk related to its birefringence properties are calculated, based on the results of the polarization analysis performed on the disk alone. In a further step, the slider is loaded onto the disk in the usual position for flying height measurement. In a next step, polarization analysis is applied to the disk-slider interface. In a final step, the flying height is calculated using the results of the polarization analysis of the disk-slider interface together with the previously-measured birefringence characteristics of the disk.

In an alternative embodiment of the present invention, the plane of incidence of the measurement beam is preferably perpendicular to a predetermined radius line drawn from the center of the disk to the measurement point. This measurement geometry is referred to herein as the zero skew position. In a first step, the polarization analysis is performed on the disk alone, with the slider removed, at a zero skew position. In a next step, a phase offset value is calculated, based on the results of the polarization analysis. In a further step, the slider is loaded onto the disk in the usual position for flying height measurement. In a next step, polarization analysis is applied to the disk-slider interface. In a final step, the flying height is calculated using the results of the polarization analysis of the disk-slider interface together with the previously-measured phase offset.

In another alternative embodiment of the present invention, the slider is gradually brought either closer to or away from the disk, such as in a process commonly referred to as either a slider load or unload, respectively. In a first step, during the slider motion, a conventional computer or like electronic data storage device conventionally records the results of the polarization analysis. In a next step, the results of the polarization analysis performed during loading or unloading are further processed to determine a characteristic of the polarization analysis attributable to birefringence in the disk. In a next step, polarization analysis is applied to the disk-slider interface. In a final step, the flying height is calculated using the results of the polarization analysis of the disk-slider interface together with the previously-measured birefringence characteristics of the disk.

In another alternative embodiment of the invention, data acquired at two or more different locations on the slider surface are used to determine the birefringence characteristics of the disk. In a first step, a computer or like electronic data storage device records the results of polarization analysis corresponding to two or more measurement positions along the slider surface. In a next step, the results of the polarization analysis performed while varying the measurement position on the slider are further processed to determine a characteristic of the polarization analysis attributable to birefringence in the disk. In a final step, the flying height is calculated using the results of the polarization analysis of the disk-slider interface together with birefringence characteristics of the disk. The birefringence analysis and the flying-height measurement may be conveniently performed simultaneously with the same data, or independently in a separate measurement sequence.

In still another alternative embodiment of the present invention, the same polarization interferometer that performs the flying height measurement is employed to determine the complex index of refraction of the slider surface. In a first step, the polarization analysis is performed on the disk alone, with the slider removed, at one or more positions on the disk. In a next step, a characteristic or plurality of characteristics of the disk related to its birefringence properties are calculated, based on the results of the polarization analysis. In a next step, during the slider load or unload, a conventional computer or like electronic data storage device conventionally records the results of the polarization analysis. In a final step, the results of the polarization analysis performed during loading or unloading are combined with the previously-measured birefringence characteristics of the disk to determine the complex index of refraction.

BRIEF DESCRIPTION OF THE DRAWINGS

The structure, operation, and methodology of the invention, together with other objects and advantages thereof, may best be understood by reading the detailed description in connection with the drawings in which unique reference numerals have been used throughout for each part and wherein.

DETAILED DESCRIPTION

Birefringence in Rotating Glass Disks

Figure 1:
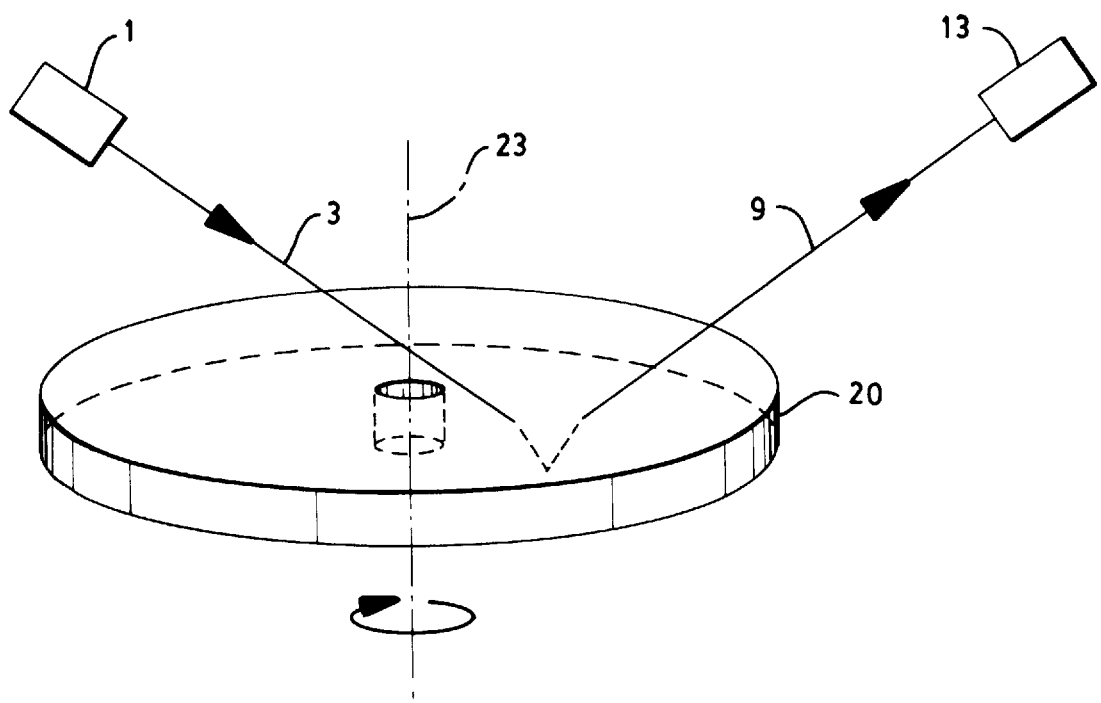
FIG. 1 is a diagrammatic drawing, partially in prespective, showing a presently preferred embodiment of the present invention.

As previously described, the most frequently-encountered optical flying height testers (OFHT's) employ a plane-parallel glass disk in place of the magnetic hard disk of an actual data storage device. The slider is viewed through the disk and analyzed for flying height using one surface of the glass disk as a reference surface. The disk is attached to a spindle and is normally in rapid rotation, spun up to typical rotation speeds being between 3,000 rpm and 12,000 rpm before measurements are made.

The rapid rotation of the glass disk induces a stress pattern related to the centripetal forces required to maintain the integrity of the glass disk. It is well understood in the art that when glass is subjected to such internal stresses, such as are generated when a glass disk is rotated at high speed, the index of refraction varies throughout the material, and in particular, and thus, the polarization state of a light beam passing through the glass becomes a function of the stress induced birefringence. The polarization state dependence of the index of refraction is commonly referred to in the art as birefringence effects. The relation between stress and birefringence is described on pages 703–705 of the book entitled *Principles of Optics,* (6$^{th}$ Edition, Pergamon Press, Oxford, 1987) by M. Born and E. Wolf.

An important consequence of birefringence is that it modifies the polarization state of a light beam passing through the birefringent material. For small amounts of birefringence, the modification may be described by a form of matrix mathematics known in the art as Jones Calculus (see G. Fowles, *Introduction to Modern Optics* (Dover, 1975), pp.33–36). The polarization state of a light beam may be represented by a 2×1 matrix:

$$E = \begin{pmatrix} E_s \\ E_p \end{pmatrix} \tag{1.}$$

where the s and p subscripts refer to a polarization parallel and perpendicular to the plane of incidence of the light beam with respect to a surface of the glass disk.

In accordance with the present invention, the net modification imparted upon the beam after passing through a birefringent glass disk may be represented by a 2×2 matrix:

$$B = \begin{pmatrix} b_\| & b_\perp \\ b_\perp & \bar{b}_\| \end{pmatrix} \tag{2.}$$

where the parameters $b_\|, b_\perp$ are related to disk birefringence. In general, the values of $b_\|, b_\perp$ vary with the position on the disk and the orientation of the incident beam. To calculate the resultant electric field E', the incident field E is multiplied by the birefringence matrix B:

$$E' = BE. \tag{3.}$$

The result of this matrix multiplication is:

$$E'_s = b_\| E_s + b_\perp E_p \tag{4.}$$

$$E'_p = \bar{b}_\| E_p + b_{195} E_s. \tag{5.}$$

These calculations show how birefringence modifies the electric field E, and in particular, how birefringence introduces a coupling between the two electric field polarizations s and p. In this calculus, the absence of birefringence is represented by $b_\| = 1$ and $b_\perp = 0$.

Birefringence and Flying Height Testing

As previously noted, a particular class of prior art OFHT employs polarized light beams and polarization-dependent interference phenomena to determine flying height. A common characteristic of such polarization-based OFHT's is the use of a single light beam, or combination of light beams, incident at an oblique angle. For example, commonly owned U.S. Pat. No. 5,557,399 entitled "Optical Gap Measuring Apparatus and Method", describes an OFHT in which a single polarized light beam carrying p- and s-polarization states along a common path is directed through the glass disk towards the slider. The combined reflections from the slider surface and the surface of the glass disk modify the polarization state of the beam. The net modification imparted upon the beam after reflection is represented by a 2×2 matrix:

$$S = \begin{pmatrix} z_s & 0 \\ 0 & z_p \end{pmatrix}, \tag{6.}$$

where $z_{s,p}$ are the effective reflectivities of the slider-glass combination. The mathematical expressions for the "effective reflectivities", $z_{s,p}$ are known in the art as thin-film equations, and are provided in my aforementioned U.S. Pat. No. 5,557,399 the contents of which are incorporatedf by reference herein. In the absence of birefringence, the reflected electric field E''' is calculated from:

$$E''' = SE \tag{7.}$$

In terms of the components of E''', the calculation works out to $$E'''_s = z_s E_s \tag{8.}$$

$$E'''_p = z_p E_p \tag{9.}$$

The electric field E''' may also be expressed in terms of a phase θ and two intensities $I_s$, $I_p$, as follows:

$$\theta = arg(E'''_s) - arg(E'''_p), \tag{10.}$$

$$I_s = |E'''_s|^2 \tag{11.}$$

$I_p=|E'''_p|^2$ (12.)

The measurement parameters $\theta, I_s, I_p$ provide the necessary information for determining the flying height.

The equations in the previous paragraph are sufficiently accurate for the case where the disk is substantially free of birefringence. However, if there is birefringence in the disk, the calculation must be modified to include a birefringence matrix for the incident path ($B_1$) and the exit path ($B_2$) of the beam. These modifications can have an important effect on the accuracy of the flying height measurement, as will presently be shown.

In the presence of birefringence, the electric field E''' represented in Eq.(7) must be replaced with:

$$E^b=(B_2SB_1)E \quad (13.)$$

where:

$$B_1 = \begin{pmatrix} b_\| & b_\perp \\ b_\perp & \overline{b}_\| \end{pmatrix} \quad (14.)$$

$$B_2 = \begin{pmatrix} b_\| & -b_\perp \\ -b_\perp & \overline{b}_\| \end{pmatrix} \quad (15.)$$

This may also be written:

$$E^b=S^bE, \quad (16.)$$

where:

$$S^b \begin{pmatrix} z_s' & z_\perp' \\ -z_\perp' & z_p' \end{pmatrix} \quad (17.)$$

for:

$$z'_p=z_p\overline{b}_\|^2+z_s|b_\perp|^2 \quad (18.)$$

$$z'_s=z_sb_\|^2+z_p|b_\perp|^2 \quad (19.)$$

$$z'_\perp=(z_sb_\|-z_p\overline{b}_\|)b_\perp \quad (20.)$$

In terms of the components of the electric field $E^b$, $$E_s^b=z'_sE_s+z'_\perp E_p \quad (21.)$$

$$E_p^b=z'_pE_p-z'_\perp E_s \quad (22.)$$

Note that when there is no birefringence in the glass disk $b_\|=1$, $b_\perp=0$, $S^b=S$, $z'_p=z_p$, $z'_s=z_s$ and $z'_\perp=0$. Thus, in the absence of birefringence, $E^b=E'''$.

The effect of birefringence on the flying height measurement is made more clear by considering the limit case of small but non-zero birefringence and an input electric field E having equal s and p components. For this case, the measurement parameters $\theta$, $I_s$, $I_p$ are replaced by analogous parameters $\theta^b$, $I_s^b$, $I_p^b$, respectively, given by the approximate formulas:

$$\theta^b=\theta+\Delta\theta \quad (23.)$$

$$I_s^b=I_s-\Delta I \quad (24.)$$

$$I_p^b=I_p+\Delta I \quad (25.)$$

where;

$$\Delta\theta = \theta_0 + a\frac{I_s-I_p}{\sqrt{I_sI_p}}\cos(\theta) \quad (26.)$$

$$\Delta I = 2a\sqrt{I_sI_p}\sin(\theta) \quad (27.)$$

for;

$$\theta_0=4arg(b_\|) \quad (28.)$$

$$a=-ib_\perp \quad (29.)$$

These equations clearly show additive distortions $\Delta\theta$, $\Delta I$ related to the birefringence parameters $b_\|$, $b_\perp$. If these additive distortions are neglected, the measurement has errors proportional to the degree of birefringence in the disk.

From the preceding discussion, it is evident these birefringence effects in the glass disk of a polarization-based OFHT modify the measurement in a potentially deleterious manner when not fully included in the data analysis method. Although the preceding discussion is in the context of a particular form of polarization-based OFHT, it will be evident to those skilled in the art that similar calculations must be performed for any OFHT employing polarized light, even those with illumination beams at normal incidence. It will also be appreciated by those skilled in the art that it is also possible to mathematically model a characteristic or plurality of characteristics of the disk related to its birefringence using parameters other than the $b_\|, b_\perp$ parameters defined herein while not departing significantly from the essential conclusions of the discussion.

In terms of the preceding mathematical discussion, a principle objective of the present invention is to measure the birefringence parameters $b_\|, b_\perp$ or analogous equivalent parameters so that they may be included in the data analysis of a polarization-based OFHT, particularly those employing oblique incidence.

Presently Preferred Embodiment

While it is possible to calculate the exact values of $b_\|, b_\perp$ for various rotations speeds, glass types and disk dimensions, the mathematics are unnecessarily complicated and have been simplified for the purposes of the present discussion. The important conclusions of the mathematical analysis incorporated in this method of the present invention are as follows. The circular symmetry of the disk imposes a circular symmetry to the stress pattern. This circular symmetry is also found in the birefringence, and manifests itself in the variation of $b_\|, b_\perp$ as a function of position and beam orientation, which is controlled in a manner to be described. Circular symmetry also makes it possible to measure $b_\|, b_\perp$ directly, using the methods and apparatus of the present invention.

Figure 2:
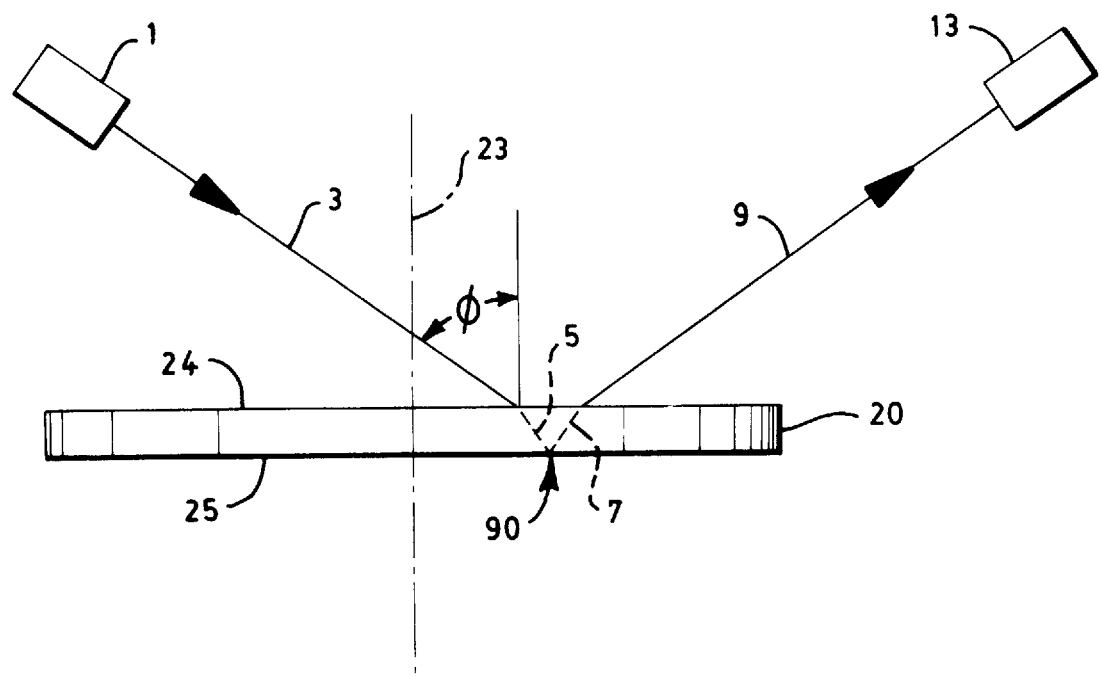
FIG. 2 is diagrammatic drawing showing a side elevational view of the embodiment of FIG. 1.
Figure 3:
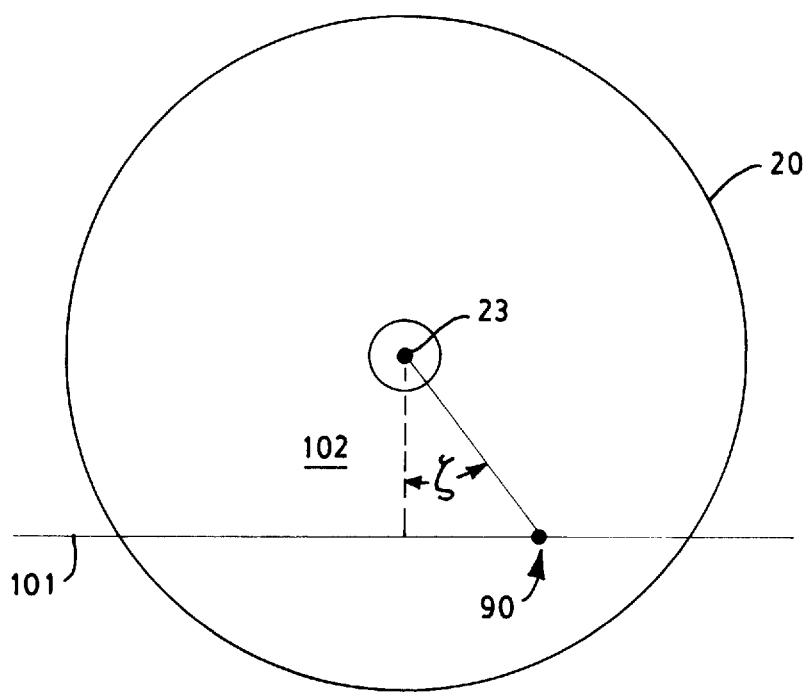
FIG. 3 is a diagrammatic top view of the embodiment of FIG. 1.

One presently preferred method and apparatus of the invention are made more clear by reference to FIGS. 1 through 3, which show the presently preferred embodiment in a partial perspective view, a side elevational view and a top view, respectively. Referring now in particular to FIG. 2, there is shown an incident beam 3 impinging upon a surface 24 of plane-parallel glass disk 20, preferably at an oblique angle φ not equal to zero. The illumination for the measurement is preferably provided by polarized light source 1, which may be a laser, an incandescent lamp, a discharge lamp or the like, together with such means as are needed to polarize incident beam 3. The plane of incidence of incident beam 3 preferably defines a polarization basis vector p, to which is associated an orthogonal basis vector s. Preferably the polarization of light beam 3 is such so that both s- and p-type polarizations are present. A refracted portion 5 of beam 3 passes through the glass towards a measurement point 90 of a reference surface 25 of disk 20. A reflected portion 7 of beam 5 passes back through the glass and is refracted back into space as a combined return beam 9, which contains s and p polarization components whose intensities and relative phase vary in accordance with the birefringent properties of glass disk 20, and as will be seen later, also in accordance with the complex index of refraction of the slider glass interface. Beam 9 then enters a phase detector 13, which measures the difference θ in phase between the s and p polarizations.

Referring now to FIG. 3, there is shown an alternative view of the apparatus showing in particular a plane of incidence 101 defined by beams 3 and 9 (not shown in FIG. 3). Of special interest is a skew angle, ζ, between plane of incidence 101 drawn through measurement point 90 perpendicular to a predetermined or select radius line 102. In accordance with the teachings of the present invention, it can be shown that the birefringence parameter $b_\perp$ is asymmetric with respect to radius line 102, which is to say that $b_\perp$ has the same magnitude at +ζ and −ζ but opposite sign. It can further be shown that the birefringence parameter $b_\parallel$ is symmetric with respect to radius line 102, which is to say that $b_\parallel$ has the same value at +ζ and −ζ. These symmetry properties are preferably exploited through the use of various procedures and formulas for calculating $b_\parallel, b_\perp$, preferably with the use of a digital computer or equivalent microprocessor.

In the presently-preferred method of the present invention, the presently preferred apparatus shown in FIG. 2 measures the phase $\theta_G$ of reflected beam 9 as a function of the position defined by measurement point 90, whose position with respect to surface 25 can be varied in a manner to be described. The subscript G refers to a phase measurement made directly from the glass disk, with the slider removed. The variation of phase $\theta_G$ with respect to position provides the birefringence parameters $b_\parallel, b_\perp$ for one or more positions on the disk. Referring now to FIG. 3, an example of a preferred procedure for the presently-preferred method of the present invention is as follows. In a first step, a phase $\theta_G = \theta^{(-)}$ is measured at a skew angle of −ζ. In a next step, a phase $\theta_G = \theta^{(+)}$ is measured at a skew angle +ζ, corresponding to the final measurement point 90 shown in FIG. 3. In a further step, the birefringence parameters $b_\parallel, b_\perp$ for measurement point 90 are calculated from:

$$b_\parallel = \exp\left(\frac{\theta^{(-)} + \theta^{(+)} + 2\pi}{-8i}\right) \qquad (30.)$$

$$b_\perp = \frac{\theta^{(+)} - \theta^{(-)}}{2iR} \qquad (31.)$$

where;

$$R = \frac{R_s - R_p}{\sqrt{R_s R_p}} \qquad (32.)$$

and $R_s, R_p$ are the intensity reflectivities of surface 25 for the s,p polarizations, respectively. These calculations follow from Eqs. (23),(26),(28),(29) above, together with the aforementioned symmetry properties of $b_\parallel, b_\perp$.

As a final step in the presently preferred method, the birefringence parameters $b_\parallel, b_\perp$ are included in the calculation of flying height. This step depends on the particular form of OFHT employed to perform the measurement. As an example, the OFHT disclosed U.S. Pat. No. 5,557,399 includes the birefringence parameters $b_\parallel, b_\perp$ according to the teachings provided herein, and in particular, Eqs.(23)–(29).

It is noteworthy that the presently preferred apparatus shown in FIGS. 1 through 3 may be added onto an existing prior-art OFHT, or may be included as part of an OFHT comprising substantially the same elements as are shown in FIGS. 1 through 3. Therefore, some or all of the shown elements of this and other embodiments of the present invention may also be used for actual flying height test measurements, as would be evident to someone skilled in the art, so as to facilitate the implementation of the complete system and reduce its overall cost.

Alternative Embodiments

In the first instance, an alternative embodiment of the present invention may be considered which is a special case of the presently preferred embodiment shown in FIGS. 1–3, and which is included here because of its particular usefulness. In this regard, it will be readily appreciated upon inspection of Eqs. (30) and (31) that when measurement point 90 corresponds to a zero-skew position, $$b_\perp = 0 \qquad (\zeta = 0) \qquad (33.)$$

$$arg(b_\parallel) = -\frac{\theta^{(+)} + \pi}{4} \qquad (\zeta = 0) \qquad (34.)$$

For this special case, the effect of birefringence on the electric field $E^b$ is reduced to a constant phase offset $\theta_0 = -(\theta^{(+)} + \pi)$, which should be subtracted from the measured difference in phase between the s and p polarizations to correct for birefringence.

Therefore, an alternative embodiment of the present invention, employing substantially the same apparatus as is shown in FIGS. 1 through 3 may be provided in which the measurement point 90 is presumed to be such that there is a zero skew angle, ζ. In accordance with this alternative embodiment, in a first step, a constant phase offset $\theta_0$ is measured by means of phase detector 13 (See FIG. 14). In a next step, constant phase offset $\theta_0$ is subtracted from all subsequent phase measurements related to flying height testing to compensate for birefringence.

Figure 4:
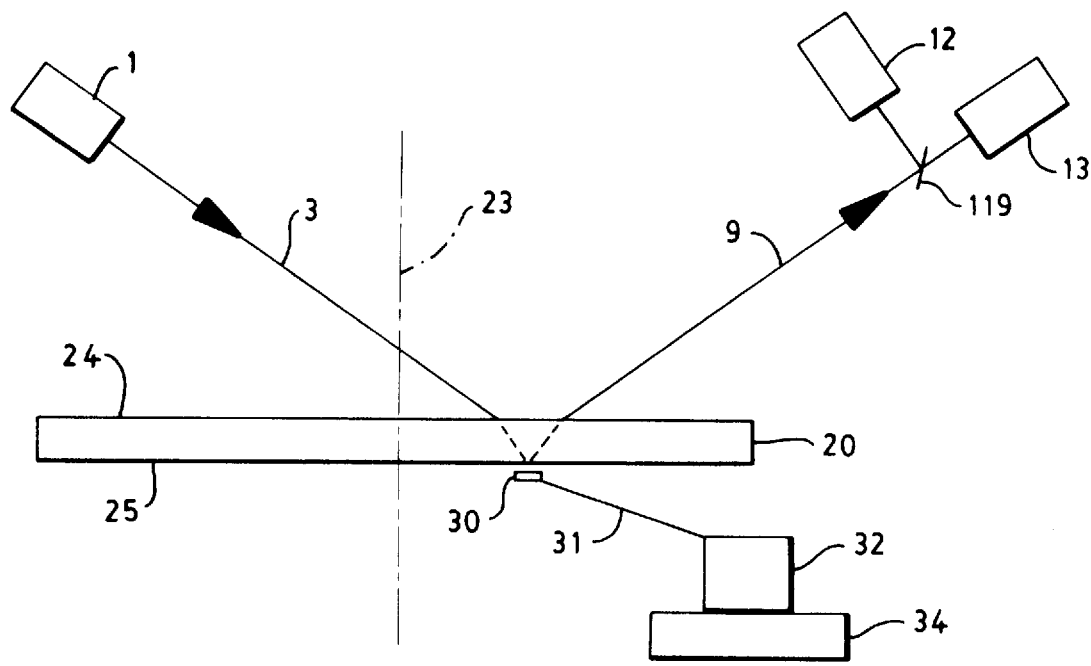
FIG. 4 is a diagrammatic drawing showing an alternative embodiment of the present invention.

In some situations, it may be found advantageous to compensate for the effects of birefringence in the glass disk using actual flying height data, rather than independent phase measurements with the slider removed, as is prescribed for the embodiments of the invention described above. Referring now to FIG. 4, there is shown an apparatus representing an alternative embodiment of a polarization-based OFHT comprising such minimum elements as are required to perform flying height testing according to the teachings of U.S. Pat. No. 5,557,399. In addition to the elements analogous to those presented in FIGS. 1 through 3, and denoted by like reference characters, there is shown in FIG. 4 a slider 30 in close proximity to reference surface 25 of glass disk 20. It will be appreciated that the slider 30 has a topography that varies in two dimensions and that this topography can be determined with the present invention by selectively controlling the point of measurement. Also shown in and mentioned in FIG. 4 is a mechanical arm 31 used to position slider 30 with respect to measurement position 90. Loading mechanism 32 is preferably mounted via a precision XYZ micropositioner 34 which provides complete control of where slider 30 can be positioned with respect to the measurement spot both laterally and vertically. Mechanical arm 31 is preferably actuated by a loading mechanism 32, such as is common in commercial flying-height test systems. In normal usage, loading mechanism 32 brings slider 30 nearly into contact with reference surface 25 by displacing it gradually from a distance greater than one wavelength of the source light along a direction substantially perpendicular to surface 25.

As a further addition to the embodiment FIG. 4 with respect to the embodiment shown in FIGS. 1 through 3, there is a beam splitter 119 and an intensity detector 12, which may be an independent optical system or may be incorporated in the phase detection means, as is taught for example in my commonly owned copending U.S. patent application entitled "Homodyne Interferometric Receiver and Method", filed Sep. 5, 1995 and bearing Ser. No. 08/523,559 the contents of which are incorporated by reference herein. Intensity detector 12 measures a value that may be expressed mathematically as:

$$I^b = I_s^b + I_p^b \tag{35.}$$

It is a characteristic of birefringence that the total measured intensity $I^b$ of beam 9, that is to say the intensity integrated over all polarizations as represented in Eq. (35), is nearly independent of the degree of birefringence. This is evident from the sum of Eqs.(24) and (25). It will, therefore, be appreciated that a comparison of the intensity variations with phase variations while slider 30 is controllably moved with respect to a disk measurement spot provides information concerning phase distortions caused by birefringence. In particular, this embodiment of the invention preferably provides the value of the factor a shown in Eq.(29) by minimizing the difference between the flying heights as determined by intensity variations and the flying height determined by phase variations.

Therefore in this, alternative embodiment of the present invention, in a first step, slider 30 is controllably positioned with respect to glass disk 20 and this may be done dynamically. During this motion, a conventional computer or like electronic data storage device (not shown) conventionally records the results of polarization analysis. In a next step, the results of the polarization analysis performed during positioning procedures are further processed to determine a characteristic of the polarization analysis attributable to birefringence in the disk. In a next step, polarization analysis is applied to the disk-slider interface. In a final step, the flying height is calculated using the results of the polarization analysis of the disk-slider interface together with the previously-measured birefringence characteristics of the disk.

The mechanical positioning of slider 30 may involve either an adjustment in the average height of slider 30 with respect to the disk, such as is effected during slider load or unload; or alternatively, an adjustment in relative position of slider 30 in relation to the point of measurement, so as to vary the height by virtue of the dependence of height on surface location.

Figure 5:
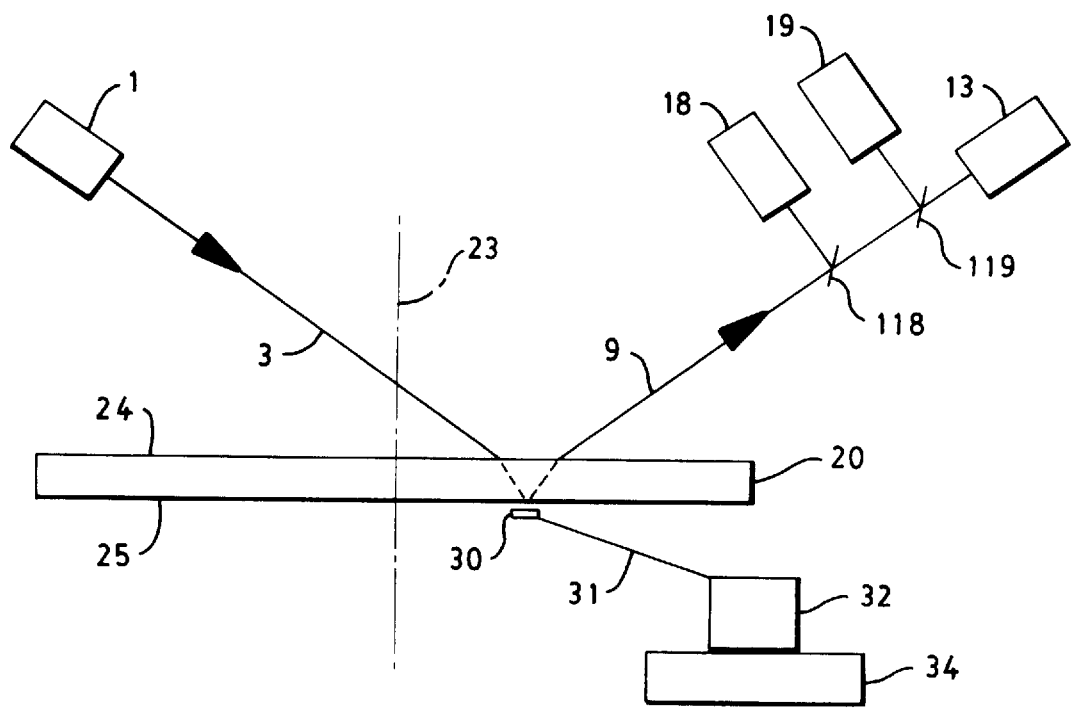
FIG. 5 is a diagrammatic drawing showing another alternative embodiment of the present invention.

Still another alternative embodiment may be described in the reference to FIG. 5. As was noted in the description of the prior art, it is generally required in the calculation of flying height to consider the phase change that occurs at the slider surface upon reflection. It is, therefore, advantageous to measure the complex index of refraction so as to calculate the phase change on reflection. It is further advantageous to perform this measurement in situ. It is, therefore, an objective of the present invention to compensate centripetal birefringence in a rapidly rotating glass disk so as to accurately measure the complex index of refraction of the slider in situ.

Accordingly, referring now to FIG. 5, there is shown an alternative embodiment of the present invention which comprises such elements as are necessary to determine the complex index of refraction. In addition to the elements analogous to those presented in FIGS. 1 through 3 and denoted by like reference characters, there is shown in FIG. 5 a slider 30 in close proximity to reference surface 25 of glass disk 20. Also shown and mentioned in FIG. 5 is a mechanical arm 31 and micropositioner 34 used to position slider 30 with respect to measurement position 90. Mechanical arm 31 is preferably actuated by a loading mechanism 32, such as is common in commercial flying-height test systems. In normal usage, loading mechanism 32 brings slider 30 nearly into contact with reference surface 25 by displacing it gradually from a distance greater than one wavelength of the source light along a direction substantially perpendicular to surface 25.

Further additions to the embodiment of FIG. 5 with respect to the embodiment of FIGS. 1 through 3 are a beam splitter 118, an s-intensity detector 18, a beam splitter 119 and a p-intensity detector 19. Intensity detectors 18 and 19 may be an independent optical system or may be incorporated in the phase detection means, as is taught, for example, in my aforementioned copending U.S. patent application bearing Ser. No. 08/523,559. Intensity detectors 18 and 19 measure intensities $I_s^b$, $I_p^b$, respectively. Since the measured values of $\theta^b$, $I_s^b$, $I_p^b$ depend on the material properties of the slider, the measured values of $\theta^b$, $I_s^b$, $I_p^b$ provide sufficient information to calculate the complex index of refraction. The data processing preferably consists of minimizing the difference between the measured values of $\theta^b$, $I_s^b$, $I_p^b$ and their predicted theoretical values. The algorithm for achieving such minimization may for example be a conventional iterative least-squares search. It should also be realized that the detectors referred to hereinabove may be array detectors adapted to measure more than one point at a time where the object surface is correspondingly illuminated.

The complex index measurement in the presence of disk birefringence requires knowledge of birefringence parameters $b_{\parallel}$, $b_{\perp}$ or their equivalents. The measurement of these parameters may preferably proceed in substantially the same way as was described for the presently preferred embodiment of the invention shown in FIGS. 1–3; i.e., one or more phase measurements are made directly from disk 20, with slider 30 removed. Example calculations are shown in Eqs.(30) and (31). The results are subsequently included in calculation of the theoretical values of $\theta^b$, $I_s^b$, $I_p^b$.

Therefore in this alternative embodiment of the present invention, in a first step, the polarization analysis is performed on disk 20 alone, with slider 30 removed, at one or more positions on disk 20. In a next step, a characteristic or plurality of characteristics of disk 20 related to its birefringence properties are calculated, based on the results of the polarization analysis. In a next step, during the slider load or unload, a conventional computer or like electronic data storage device (not shown) conventionally records the results of polarization analysis. In a final step, the results of the polarization analysis performed during loading or unloading are combined with the previously-measured birefringence characteristics of disk 20 to determine the complex index of refraction of slider 30.

As discussed above, the present invention overcomes many of the problems in the prior art, such as in magnetic data storage systems where it is required to measure the flying height of a slider on a rapidly rotating rigid disk in order to verify the performance of the slider assembly. Some forms of such prior art optical flying height tester use polarization as part of the measurement. Since polarized light is effected by birefringence phenomena in a rotating glass disk, it is essential to measure and compensate for these phenomena. Whereas the prior art provides no methods or means for performing such compensation, the present invention provides a method and means for measuring and compensating birefringence generated by centripetal stresses in rapidly rotating disks using a measurement principle based on the circular symmetry of the birefringence phenomena. The various preferred embodiments disclosed herein cover direct measurement of birefringence from the glass disk with the slider removed, as well as compensation techniques based on interpretation of data acquired while moving slider 30 toward or away form disk 20 in controllable ways. The methods of the present invention apply not only to the measurement of flying height, but also to the determination of the complex index of refraction in situ. Moreover, the apparatus of the present invention are compatible with known forms of polarization-based OFHT's and may be incorporated in such systems at minimal cost.

It will be appreciated by those skilled in the art that the teachings of the present invention may be applied to alternative flying height systems that depend in part on polarization effects for their successful use. For example, it may prove advantageous for some applications to combine a known form of flying height sensor operating at normal incidence with a known form of ellipsometer for measuring the complex index in situ, as noted in the description of the prior art. Moreover, since commonly-known ellipsometric analysis also requires birefringence compensation, the teachings of the present invention may be advantageously applied to such systems.

It will also be appreciated by those skilled in the art that various omissions and substitutions and changes in form or detail of the disclosed methods and apparatus of the present invention may be made without departing from the spirit and scope of the present invention. For example, although the various embodiments preferably employ phase measurements to calculate birefringence, the apparatus shown in FIG. 5 provides intensity information that may be used to calculate birefringence in a similar fashion, according to the teachings provided herein. It will be further appreticated that some of the steps in the various embodiments that require measurements from the glass disk without the slider may be accomplished by positioning the measurement beam to one side or the other of the slider, without actually removing the slider entirely from the disk. It will also be appreciated that various lenses, mirrors or like optical elements may be added to or subtracted from the embodiments shown in the drawings to facilitate implementation of the various embodiments, and that the birefringence os such components can be compensated, as needed, without departing significantly from the method and apparatus of the present invention.

What is claimed is:

1. Apparatus for analyzing a gap separating two surfaces, said apparatus comprising:

a transparent element having a reference surface and birefringent properties;

mounting means for facilitating the relative positioning of an object surface with respect to said reference surface so that the size of the gap between said reference surface and said object surface varies in a characteristic way as a function of the relative position between the two;

means for selectively directing at least one polarized beam of illumination containing p- and s-polarization states at said transparent element along a common path at at least one location corresponding to a measurement spot over said gap while said object and reference surfaces are in at least one relative position with respect to one another, said polarized beam of illumination being incident to said transmitting element at a predetermined angle of incidence and reflected from said reference surface and said object surface as a combined return beam that emerges from said transparent element to travel along a predetermined measurement path disposed along a predetermined angle with respect to said predetermined angle of incidence, said combined return beam containing p- and s-polarization components whose intensities and relative phase vary in accordance with the birefringent properties of said transparent element and the size of the gap between said reference surface and said object surface at the spot of measurement;

polarization analysis means for measuring said combined return beam to determine the intensities and relative phase of its p- and s-polarization components and generate data that relates the birefringent properties of said transparent element and size of the gap with the values of the measured intensities and relative phase of said p- and s-polarization components; and analytical means for determining the birefringent properties of said transparent element, compensating for them, and then determining the size of the gap between said reference and object surfaces for at least one predetermined object position and measurement spot on said object surface.

2. The apparatus of claim 1 wherein said predetermined angle of incidence and said predetermined angle of said predetermined measurement path are both oblique with respect to said transparent element.

3. The apparatus of claim 1 wherein said mounting means, said means for selectively directing said polarized beam, and said polarization analysis means for another to generate data for more than one point over said gap while said reference and object surfaces are in any of their relative positions with respect to one another.

4. The apparatus of claim 1 wherein said mounting means, said means for selectively directing said polarized beam, and said polarization analysis means for measuring said combined return beam are configured and arranged with respect to one another to generate data from a single location with respect to said gap as the relative position between said reference and object surfaces varies.

5. The apparatus of claim 4 wherein said mounting means, said means for selectively directing said polarized beam, and said polarization analysis means for measuring said combined return beam are further configured and arranged with respect to one another to generate data from more than one location with respect to said gap as the relative position between said reference and object surfaces varies.

6. The apparatus of claim 1 wherein said transparent element comprises a surrogate glass disk mounted for rotation about a central axis.

7. The apparatus of claim 6 wherein object surface comprises part of a magnetic head slider.

8. The apparatus of claim 7 wherein said surrogate glass disk has two spaced apart substantially parallel planar surfaces and one of said planar surfaces is said reference surface.

9. The apparatus of claim 8 wherein said planar reference surface of said surrogate glass disk and the geometry of said magnetic head slider surface are such that said gap between the two varies in two dimensions.

10. The apparatus of claim 1 further including means for moving said transparent element with respect to said object surface at least while said reference surface and said object surface are in one position relative to one another such that said birefringent properties thereof change when said transparent element is in motion.

11. The apparatus of claim 10 wherein said transparent element comprises a circular glass disk mounted for rotation about a central axis of rotation.

12. The apparatus of claim 11 wherein said photodetector means comprises a least one area array for measuring more than one point under a spot illuminated by said polarizing beam.

13. The apparatus of claim 11 wherein said photodetector means comprises intensity photodetector means and phase photodetector means.

14. The apparatus of claim 1 wherein said means for measuring said combined return beam comprises photodetector means and polarizing means.

15. The apparatus of claim 1 said analytical means includes means for determining the complex index of refraction of the object surface wherein the complex index of refraction is calculated by determining the relative phase differences in accordance with the expression $\theta(\beta)=\arg[z_s(\beta)]-\arg[z_p(\beta)]+\zeta$ where $z_{s,p}(\beta)$ are the effective reflectivities of the object surface under test and the reference surface taken together, and where $\zeta=\arg(\alpha''e_s)-\arg(\alpha''_p)$, where $\alpha''_{s,p}$ are the electric field components of said incident polarized beam for the s and p polarizations, and where $\beta=2kh\cos(\phi)$, where k is the angular wavenumber of the source light, $\phi$ is the angle of incidence, and h is the distance of the object under test with respect to the transparent element surface at a point of measurement.

16. The apparatus of claim 1 wherein said transparent element is a circular glass disk mounted for rotation about a central axis of rotation, said incident and combined return beams lie in a plane that is perpendicular to a select radius from said central axis of rotation to said perpendicular plane, and the point of measurement for generating data from which said birefringent properties are determined is at a zero skew position with respect to said central axis of rotation.

17. The apparatus of claim 1 wherein said polarization analysis means is configured to measure any difference 0 in phase between said s and p polarization components of said combined return beam, said combined return beam having an associated phase $\theta_G$ made directly from said transparent element and comprising a function of position defined by said measurement point on said reference surface of said tranparent element, any variation of said phase $\theta_G$ with respect to said position providing birefringence parameters $b_\parallel, b_\perp$ for said measurement positions on said transparent element, said incident beam and said combined return beam defining a plane of incidence, a skew angle $\zeta$ being defined between said plane of incidence drawn through a measurement point perpendicular to a select radius line for said transparent element, $b_\parallel$ being symmetric with respect to said radius line and $b_\perp$ being asymmetric with respect to said radius line, wherein said phase $\theta_G$ at said skew angle $+\zeta$ and $-\zeta$ provides said birefringence parameters $b_\parallel, b_\perp$ for said measurement point which are determined in accordance with the expression $$b_\parallel = \exp\left(\frac{\theta^{(-)}+\theta^{(+)}+2\pi}{-8i}\right)$$

$$b_\perp = \frac{\theta^{(+)}-\theta^{(-)}}{2iR}$$

$$R = \frac{R_s - R_p}{\sqrt{R_s R_p}}$$

and $R_s, R_p$ are the intensity reflectivities of said transparent element surface for said s and p polarization, respectively.

18. The apparatus of claim 17 wherein said measurement point corresponds to a zero skew position wherein $b_\perp=0$ and $$arg(b_\parallel) = -\frac{\theta^{(+)}+\pi}{4},$$

and any effect of birefringence on any electric field $E^b$ is reduced to a constant phase offset $$\theta_0 = -(\theta^{(+)}+\pi),$$

said phase offset being subtracted from the measured difference in phase between the s and p polarizations to correct for said birefringence of said transparent element and wherein said analytical means is further configured to determine said constant phase offset $\theta_c$ and subtract subsequent phase measurements related for compensating for said birefringence.

19. The apparatus of claim 1 wherein said polarization analysis means further comprises phase detection means including beamsplitter means and intensity detection means for measuring intensity values in accordance with the expression $I^b=I_s^b+I_p^b$ and comparing variations in said measured intensity values with phase variations $\theta^b$ during relative motion between said transparent element and object surface for minimizing the difference between the gap as determined by said intensity variations $I^b$ and as determined by said phase variations $\theta^b$.

20. The apparatus of claim 19 wherein said analytical means are configured to determine a complex index of refraction for said object surface from said measured values of $\theta^b$, $I_s^b$, and $I_p^b$.

21. A method for analyzing a gap separating two surfaces, said method comprising the steps of:

providing a transparent element having a reference surface and birefringent properties;

facilitating the relative positioning of an object surface with respect to said reference surface so that the size of the gap between said reference surface and said object surface varies in a characteristic way as a function of the relative position between the two;

selectively directing at least one polarized beam of illumination containing p- and s-polarization states at said transparent element along a common path at at least one location corresponding to a measurement spot over said gap while said object and reference surfaces are in at least one relative position with respect to one another, said polarized beam of illumination being incident to said transmitting element at a predetermined angle of incidence and reflected from said reference surface and said object surface as a combined return beam that emerges from said transparent element to travel along a predetermined measurement path disposed along a predetermined angle with respect to said predetermined angle of incidence, said combined return beam containing p- and s-polarization components whose intensities and relative phase vary in accordance with the size of the gap between said reference surface and said object surface at the spot of measurement;

performing a polarization analysis on said combined return beam to determine the intensities and relative phase of its p- and s-polarization components and generate data that relates the size of the gap with the values of the measured intensities and relative phase of said p- and s-polarization components; and determining the birefringence properties of said transparent element and the size of the gap between said reference and object surfaces for at least one predetermined object position and measurement spot on said object surface.

22. The method of claim 21 wherein said predetermined angle of incidence of said polarized beam of illumination and said predetermined angle of said predetermined measurement path are both oblique with respect to said transparent element.

23. The method of claim 21 wherein said polarized beam of illumination and said reference and object surfaces are manipulated to generate data for more than one point over said gap while said reference and object surfaces are in any of their relative positions with respect to one another.

24. The method of claim 21 wherein said polarized beam of illumination and said reference and object surfaces are manipulated to generate data from a single point over said gap as the relative position between said reference and object surfaces is made to vary.

25. The method of claim 21 wherein said polarized beam of illumination and said reference and object surfaces are manipulated to generate data from more than one location with respect to said as the relative position between said reference and object surfaces is made to vary.

26. The method of claim 21 wherein said transparent element comprises a surrogate glass disk mounted for rotation about a central axis.

27. The method of claim 26 wherein the object surface comprises part of a magnetic head slider.

28. The method of claim 26 wherein said surrogate glass disk has two spaced apart substantially parallel planar surfaces and one of said planar surfaces is said reference surface.

29. The method of claim 28 wherein said planar reference surface of said surrogate disk and the geometry of said magnetic head slider surface are such that said gap between the two varies in two dimensions.

30. The method of claim 21 further including the step of moving said transparent element with respect to said object surface at least while said reference surface and said object surface are in one position relative to one another.

31. The method of claim 21 wherein said step of measuring said combined return beam comprises using a photodetector means and polarizing means.

32. The method of claim 31 wherein said photodetector means comprises a least one area array for measuring more than one point under a spot illuminated by said polarizing beam.

33. The method of claim 31 wherein said photodetector means comprises intensity photodetector means and phase photodetector means.

34. The method of claim 21 further including the step of determining the complex index of refraction of said object surface.

35. The method of claim 34 wherein the step of determining the complex index of refraction of the object surface and the size of the gap comprises calculating relative phase differences in accordance with the expression $\theta(\beta)=arg[z_s(\beta)]-arg[z_p(\beta)]+\zeta$ where $z_{s,p}(\beta)$ are the effective reflectivities of the object surface under test and the reference surface taken together, and where $\zeta=arg(\alpha''_s)-arg(\alpha''_p)$, where $\alpha''_{s,p}$ are the electric field components of said incident polarized beam for the s and p polarizations, and where $\beta=2kh\cos(\phi)$, where k is the angular wavenumber of the source light, $\phi$ is the angle of incidence, and h is the distance of the object under test with respect to the transparent element surface at a point of measurement.

36. The method of claim 21 wherein said transparent element is a circular glass disk mounted for rotation about a central axis of rotation, said incident beam of illumination and combined return beams lie in a plane that is perpendicular to a select radius from said central axis of rotation to said perpendicular plane, and the point of measurement for generating data from which said birefringent properties are determined is at a zero skew position with respect to said central axis of rotation.

37. The method of claim 21 wherein said polarization analysis step measures any difference $\theta$ in phase between said s and p polarization components of said combined return beam, said combined return beam having an associated phase $\theta_G$ made directly from said transparent element and comprising a function of position defined by said measurement point on said reference surface of said tranparent element, any variation of said phase $\theta_G$ with respect to said position providing birefringence parameters $b_\parallel, b_\perp$ for said measurement positions on said transparent element, said incident beam and said combined return beam defining a plane of incidence, a skew angle $\zeta$ being defined between said plane of incidence drawn through a measurement point perpendicular to a select radius line for said transparent element, $b_\parallel$ being symmetric with respect to said radius line and $b_\perp$ being asymmetric with respect to said radius line, wherein said phase $\theta_G$ at said skew angle $+\zeta$ and $-\zeta$ provides said birefringence parameters $b_\parallel, b_\perp$ for said measurement point which are determined in accordance with the expression $$b_\parallel = \exp\left(\frac{\theta^{(-)} + \theta^{(+)} + 2\pi}{-8i}\right)$$

$$b_\perp = \frac{\theta^{(+)} - \theta^{(-)}}{2iR}$$

$$R = \frac{R_s - R_p}{\sqrt{R_s R_p}}$$

and $R_s$, $R_p$ are the intensity reflectivities of said transparent element surface for said s and p polarization, respectively.

38. The method of claim 37 wherein said measurement point corresponds to a zero skew position wherein $b_\perp = 0$ and $$arg(b_\parallel) = -\frac{\theta^{(+)} + \pi}{4},$$

and any effect of birefringence on any electric field $E^b$ is reduced to a constant phase offset $\theta_0 = -(\theta^{(+)} + \pi)$, said phase offset being subtracted from the measured difference in phase between the s and p polarizations to correct for said birefringence of said transparent element and wherein said analytical means is further configured to determine said constant phase offset $\theta_c$ and subtract subsequent phase measurements related for compensating for said birefringence.

39. The method of claim 21 wherein said polarization analysis sttep further comprises phase detecting and intensity detecting for measuring intensity values in accordance with the expression $I^b = I_s^b + I_p^b$ and comparing variations in said measured intensity values with phase variations $\theta^b$ during relative motion between said transparent element and object surface for minimizing the difference between the gap as determined by said intensity variations $I^b$ and as determined by said phase variations $\theta^b$.

40. The method of claim 39 further including the step determining the complex index of refraction for said object surface from said measured values of $\theta^b$, $I_s^b$, and $I_p^b$.

* * * * *